(12) United States Patent
Choi et al.

(10) Patent No.: US 9,076,268 B2
(45) Date of Patent: Jul. 7, 2015

(54) METHOD AND SYSTEM FOR ANALYZING MULTI-CHANNEL IMAGES

(71) Applicant: SAMSUNG TECHWIN CO., LTD., Changwon (KR)

(72) Inventors: Eun-Ji Choi, Changwon (KR); Jeong-Eun Lim, Changwon (KR); Il-Kwon Chang, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 169 days.

(21) Appl. No.: 13/793,420

(22) Filed: Mar. 11, 2013

(65) Prior Publication Data

US 2013/0236120 A1    Sep. 12, 2013

(30) Foreign Application Priority Data

Mar. 12, 2012 (KR) ......................... 10-2012-0025225

(51) Int. Cl.
*G06K 9/36* (2006.01)
*G06T 11/60* (2006.01)
*G06T 7/20* (2006.01)
*G08B 13/196* (2006.01)

(52) U.S. Cl.
CPC ............... *G06T 11/60* (2013.01); *G06T 7/2053* (2013.01); *G06T 7/2093* (2013.01); *G06T 2207/30232* (2013.01); *G08B 13/19645* (2013.01)

(58) Field of Classification Search
None
See application file for complete search history.

(56) References Cited

U.S. PATENT DOCUMENTS

| | | | | |
|---|---|---|---|---|
| 5,800,364 A | * | 9/1998 | Glennie et al. | 600/592 |
| 8,073,261 B2 | * | 12/2011 | Skans | 382/209 |
| 2003/0234907 A1 | * | 12/2003 | Kawai | 351/206 |
| 2004/0057618 A1 | * | 3/2004 | Magee et al. | 382/173 |
| 2004/0075741 A1 | * | 4/2004 | Berkey et al. | 348/159 |
| 2005/0134941 A1 | * | 6/2005 | Fukuda et al. | 358/474 |
| 2010/0079594 A1 | * | 4/2010 | Voglewede et al. | 348/155 |

FOREIGN PATENT DOCUMENTS

| | | |
|---|---|---|
| KR | 10-0338421 B1 | 5/2002 |
| KR | 10-2006-0086505 A | 8/2006 |
| KR | 10-0853959 B1 | 8/2008 |
| KR | 10-2010-0033605 A | 3/2010 |

* cited by examiner

*Primary Examiner* — Chan Park
*Assistant Examiner* — Eueng-Nan Yeh
(74) *Attorney, Agent, or Firm* — Sughrue Mion, PLLC (57) ABSTRACT

A method and a system for analyzing multi-channel images are provided. The method includes: receiving a plurality of images through a plurality of channels, respectively; combining selected images among the plurality of images into a single image; and performing an image analysis with respect to: entirety of the combined image by treating the selected images as a single image; or each of the selected images in the combined image.

18 Claims, 9 Drawing Sheets

METHOD AND SYSTEM FOR ANALYZING MULTI-CHANNEL IMAGES

CROSS-REFERENCE TO RELATED PATENT APPLICATION

This application claims priority from Korean Patent Application No. 10-2012-0025225, filed on Mar. 12, 2012, in the Korean Intellectual Property Office, the disclosure of which is incorporated herein in its entirety by reference.

BACKGROUND

1. Field

Methods and system consistent with exemplary embodiments of the inventive concept relate to analyzing multi-channel images, and more particularly, to analyzing multi-channel images received through a plurality of channels, combining the multi-channel images into a single image, and performing a single microprocessor image analysis based on the combined single image.

2. Description of the Related Art

An image surveillance system is a system for real-time surveillance or ex post facto check which is constituted by installing a plurality of cameras at a plurality of locations to monitor an area or a plurality of areas. The cameras are configured to transmit images obtained by monitoring the locations. The image surveillance system may also store the images in a storage device.

Image signals obtained by the plurality of cameras are transmitted to a device, such as a digital video recorder (DVR) or a network video recorder (NVR), for management convenience, and a user may manage a plurality of channels through which the image signals are transmitted, simultaneously.

Korean Patent No. 0338421 discloses a method of providing wide-angle moving images by combining and synthesizing a plurality of moving images obtained by a plurality of video cameras through a plurality of channels, respectively.

However, a surveillance system adopting the method disclosed in Korean Patent No. 0338421 should have the same number of microprocessors as the channels to analyze the plurality of images. If, however, the number of microprocessors is insufficient to analyze the plurality of images, an alternative method of sequentially analyzing and displaying the plurality of images by using a time-division technique has been used.

Having the same number of microprocessors as the plurality of channels in a surveillance system causes increase in installation and maintenance costs as the number of images increases, whereas using the time-division technique may deteriorate an analysis performance due to limitations of efficient use of system resources.

In addition, along with increase in the number of surveillance camera channels, techniques for detecting events by using image processing techniques are being developed to resolve insufficiency of manpower. For example, intelligent image analyzing techniques for detecting motions in images, tracking objects in images, and detecting faces are being developed.

SUMMARY

One or more exemplary embodiments provide a method and a system for analyzing multi-channel images for improving the performance and efficiency of a surveillance system by processing and analyzing images based on combined images.

According to an aspect of an exemplary embodiment, there is provided a method of analyzing multi-channel images, the method including: receiving a plurality of images through a plurality of channels, respectively; combining selected images among the plurality of images into a single image; and performing an image analysis with respect to: entirety of the combined image by treating the selected images as a single image; or each of the selected images in the combined image.

In case of performing the image analysis with respect to each of the selected images, different image analyzing methods may be applied to at least two of the selected images, respectively.

The method may further include: obtaining information regarding each of the selected images and determining whether to perform the image analysis with respect to entirety of the combined image by treating the selected images as a single image, or with respect to each of the selected images in the combined image, based on the obtained information.

If all of the selected images in the combined image are larger than a reference size, the image analysis is performed with respect to entirety of the combined image by treating the selected images as a single image, and, if at least one of the selected images in the combined image is not larger than the reference size, the image analysis is performed with respect to each of the selected images in the combined image.

If all of the selected images in the combined image are constituted by pixels larger than a reference number of pixels, the image analysis is performed with respect to entirety of the combined image by treating the selected images as a single image, and if at least one of the selected images in the combined image is constituted by pixels not larger than the reference number of pixels, the image analysis is performed with respect to each of the selected images in the combined image.

The method of analyzing multi-channel images may include pre-processing the combined image before the performing the image analysis, wherein the pre-processing comprises at least one of image size conversion, color space conversion and color dimension conversion.

The method of analyzing multi-channel images may include detecting a foreground region in the combined image by processing the entirety of the combined image by treating the selected images as a single image, wherein the performing the image analysis comprises detecting occurrence of camera tempering to at least one of a plurality of cameras, from which the plurality of images are obtained, with respect to each of the plurality of channels.

Alternatively, the method of analyzing multi-channel images may include: detecting a motion region in the combined image by processing the entirety of the combined image with treating the selected images as a single image; obtaining location information about the motion region; and determining a channel, among selected channels among the plurality of channels, corresponding to the motion region.

The method of analyzing multi-channel images may include: combining the selected images used for the image analysis into another single image, after performing the image analysis with respect to each of the selected images in the combined image; and outputting the other single image with a result of the image analysis.

According to an aspect of another exemplary embodiment, there is provided a multi-channel image analyzing system including: an image receiving unit which receives a plurality of images through a plurality of channels, respectively; an image combining unit which combines selected images among the plurality of images into a single image; and an image analyzing unit which performs an image analysis with respect to: entirety of the combined image by treating the selected images as a single image; or each of the selected images in the combined image.

The image combining unit may be configured to combine a user-selected number of images.

The image analyzing unit may perform the image analysis with respect to each of the selected images in the combined image by applying different image analyzing methods to at least two of the selected images, respectively.

The multi-channel image analyzing system may further include an image analyzing method selecting unit which obtains information regarding each of the selected images and determines whether to perform the image analysis with respect to entirety of the combined image by treating the selected images as a single image, or with respect to each of the selected images in the combined image, based on the obtained information.

If the image analyzing method selecting unit determines that all of the selected images in the combined image are larger than a reference size, the image analyzing unit performs the image analysis with respect to entirety of the combined image by treating the selected images as a single image, and if the image analyzing method selecting unit determines that at least one of the selected images in the combined image is not larger than the reference size, the image analyzing unit performs the image analysis with respect to each of the selected images in the combined image.

If the image analyzing method selecting unit determines that all of the selected images in the combined image are constituted by pixels larger than a reference number of pixels, the image analyzing unit performs the image analysis with respect to entirety of the combined image by treating the selected images as a single image, and wherein, if the image analyzing method selecting unit determines that at least one of the selected images in the combined image is constituted by pixels not larger than the reference number of pixels, the image analyzing unit performs the image analysis with respect to each of the selected images in the combined image.

The multi-channel image analyzing system may further include an image pre-processing unit which performs pre-processing the combined image before the image analyzing unit performs the image analysis, wherein the pre-processing comprises at least one of image size conversion, color space conversion and color dimension conversion.

The image analyzing unit may include: a foreground detection unit which detects a foreground region in the combined image by processing the entirety of the combined image by treating the selected images as a single image; and an event detecting unit which detects occurrence of camera tempering to at least one of a plurality of cameras, from which the plurality of images are obtained, with respect to each of the plurality of channels.

Alternatively, the image analyzing unit may include: a foreground detection unit which detects a motion region in the combined image by processing the entirety of the combined image with treating the selected images as a single image; and an event detecting unit which obtains location information about the motion region, and determines a channel, among selected channels in the plurality of channels, corresponding to the motion region.

The multi-channel image analyzing system may further include an image output unit which: combines the selected images used for the image analysis into another single image, after the image analyzing unit performs the image analysis with respect to each of the selected images in the combined image; and outputs the other single image with a result of the image analysis.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the inventive concept to those skilled in the art. Like reference numerals in the drawings denote like elements, and thus their description will be omitted.

Hereinafter, the inventive concept will be described in detail by explaining exemplary embodiments with reference to the attached drawings.

Figure 1A:
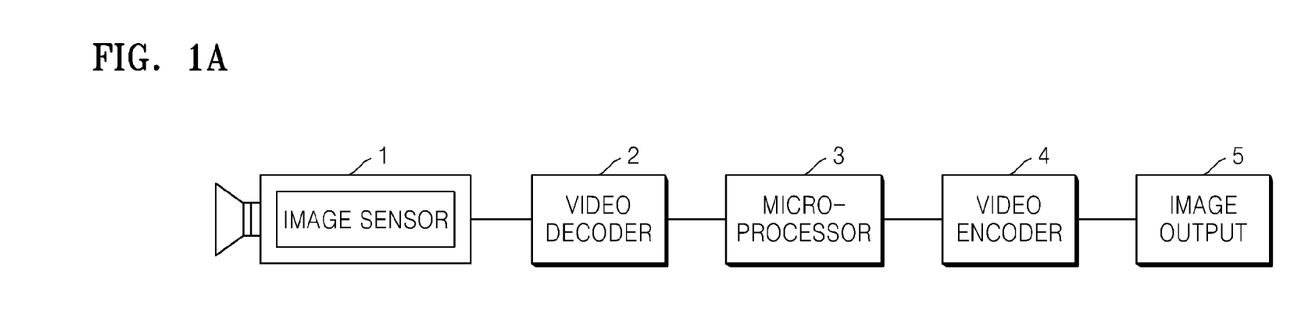
FIGS. 1A and 1B illustrate system configurations of a surveillance camera system according to exemplary embodiments.

FIG. 1A is a diagram showing a system configuration of a surveillance camera system which monitors an area by displaying images of the monitored area, according to an exemplary embodiment.

Referring to FIG. 1A, a process of obtaining images of the monitored area and processing and displaying the images may be explained. First, in the surveillance camera system as shown in FIG. 1A, images of the monitored area are converted to electrical image signals by an image detecting device, such as an image sensor included in a camera 1, and the electrical image signals are output. Next, the electrical image signals obtained by the camera 1 are decoded into images by a video decoder 2 if the electrical image signals have been encoded at the camera 1, and a microprocessor 3 analyzes and processes the decoded image signals. Next, the image signals are re-encoded for transmission by a video encoder 4 and are transmitted to an image output 5 such as a display.

Figure 1B:
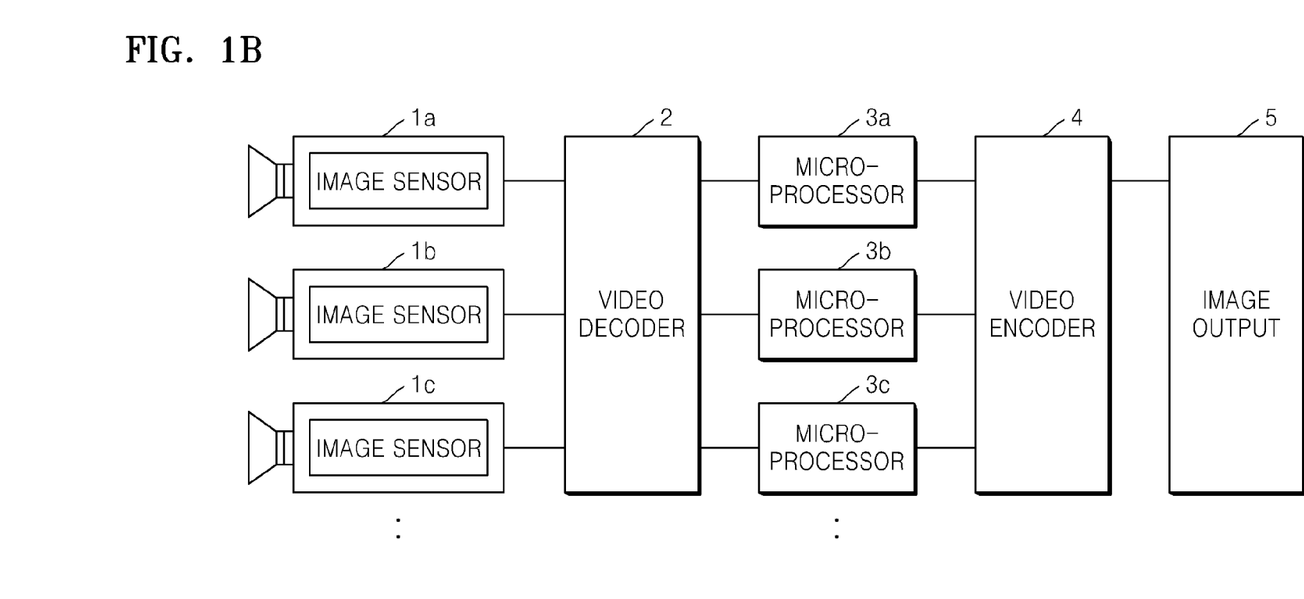

In a surveillance camera system as shown in FIG. 1B according to another exemplary embodiment, multi-channel images of at least one monitored area are captured and converted to respective electrical image signals by a plurality of surveillance cameras including cameras 1a, 1b and 1c which includes respective image sensors. The electrical image signals are decoded by a video decoder 2 if the electrical image signals have been encoded at the plurality of cameras, respectively. Next, a plurality of microprocessors including microprocessors 3a, 3b and 3c analyze the decoded image signals of respective channels.

For the plurality of microprocessors to analyze and process the multi-channel image signals, it is necessary to allocate the plurality of microprocessors to respective channels for analyzing and processing images of the respective channels, or to use a high-performance microprocessor (not shown) capable of analyzing the multi-channel images. Next, a video encoder 4 re-encodes the analyzed and processed image signals for transmission to the image output 5.

In a case where the single microprocessor (not shown) analyzes and processes the multi-channel images, a time-division technique is utilized to efficiently use system resources.

Figure 2:
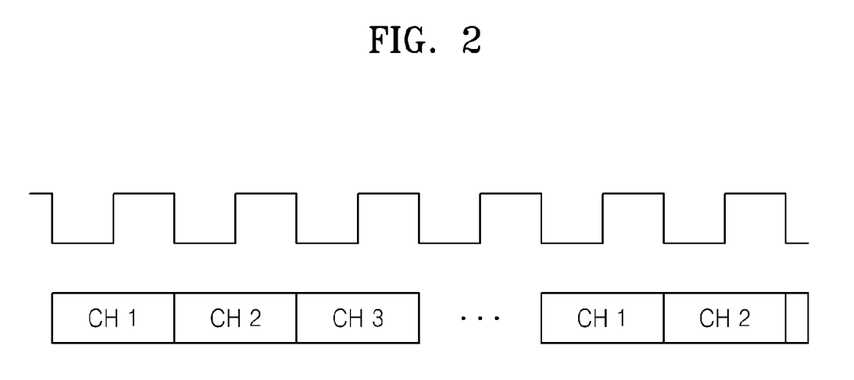
FIG. 2 is a diagram showing a time-division technique used for processing multi-channel images, according to an exemplary embodiment.

FIG. 2 is a diagram showing a time-division technique used for processing multi-channel images by the single microprocessor.

Referring to FIG. 2, to process multi-channel images, the single microprocessor processes a single channel per clock cycle and processes another channel after a clock cycle is completed.

In the case of processing multi-channel images by using such a time-division technique, performance of the single microprocessor may deteriorate and it is difficult to increase the number of channels due to limited resources.

In the systems as shown in FIGS. 1A and 1B, one channel image signal is processed by one microprocessor. Therefore, as the number of channels increases, the number of microprocessors also increases. Therefore, a method of analyzing images, according to an exemplary embodiment, provides a system in which multi-channel images are combined to be processed by a single microprocessor.

Figure 3:
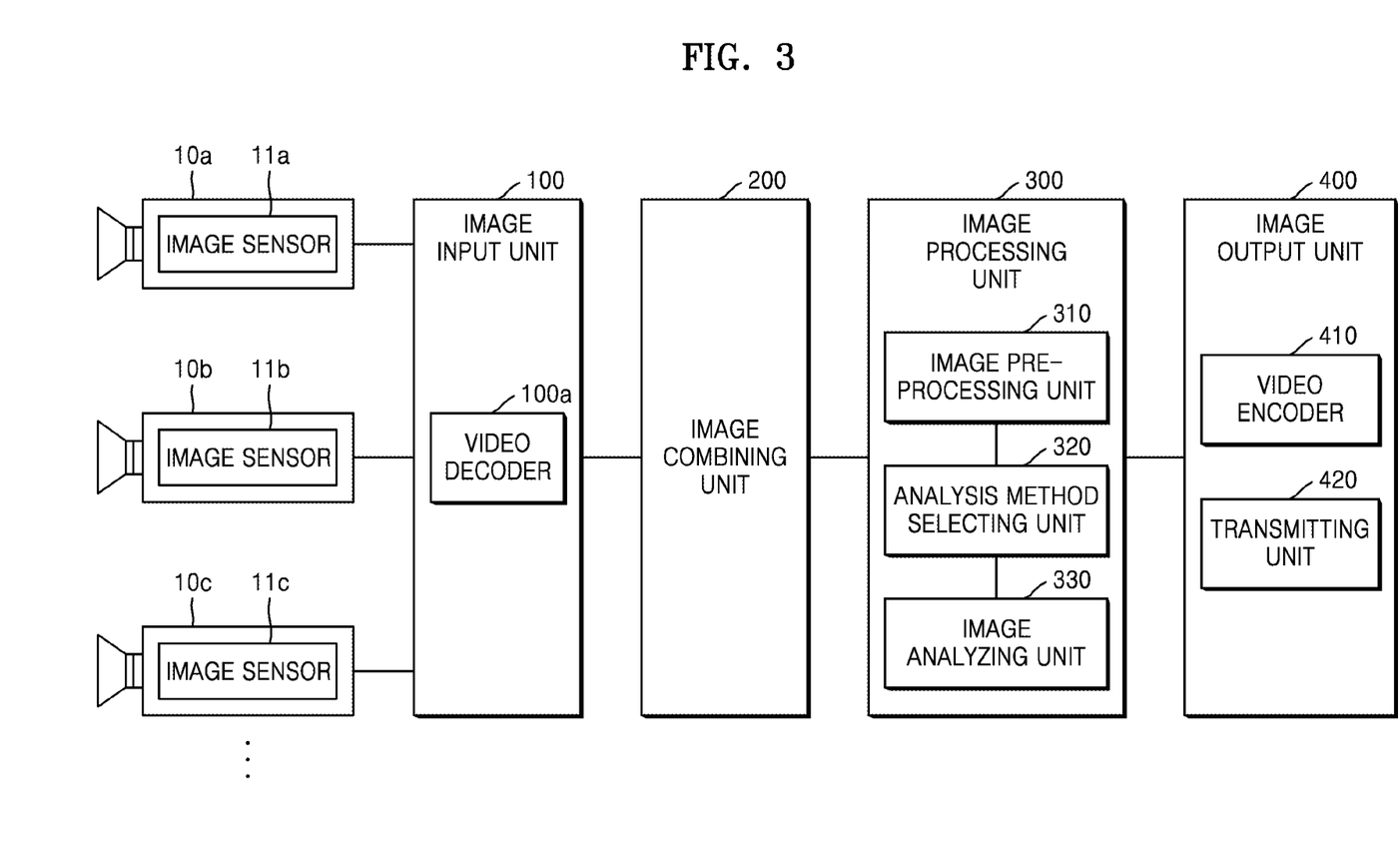
FIG. 3 is a schematic diagram showing a configuration of a multi-channel image analyzing system according to an exemplary embodiment.

FIG. 3 is a schematic diagram showing a configuration of a multi-channel image analyzing system according to an exemplary embodiment.

Referring to FIG. 3, the multi-channel image analyzing system includes a plurality of cameras including cameras 10a, 10b and 10c which includes respective image sensors. The system also includes an image input unit 100, an image combining unit 200, an image processing unit 300, and an image output unit 400.

First, the plurality of cameras are image capturing devices for obtaining images of at least one monitored area. According to the current embodiment, the cameras may be arranged to provide multi-channel images of the monitored area.

According to an exemplary embodiment, the cameras may be image capturing devices that are installed at the at least one monitored area for surveillance, e.g., CCTVs, camcorders, etc. Furthermore, the cameras respectively include respective image sensors including image sensors 11a, 11b and 11c for converting captured images to electric image signals.

Next, the image input unit 100 converts analog image signals input from the plurality of cameras to digital signals. Although FIG. 3 shows that the image input unit 100 corresponding to respective channels is arranged outside the cameras, the image input unit 100 may also be arranged in the respective cameras with the image sensors. Furthermore, the image input unit 100 may include a video decoder 100a for converting the input analog image signals to digital image signals.

Next, the image combining unit 200 may combine multi-channel images transmitted from the image input unit 100 to a single image.

The image combining unit 200 combines the multi-channel images to a single image according to the number of channels and a user-selected method of outputting the multi-channel images.

FIGS. 4A to 4D illustrate methods of combining multi-channel images to a single image, according to exemplary embodiments.

Figure 4A:
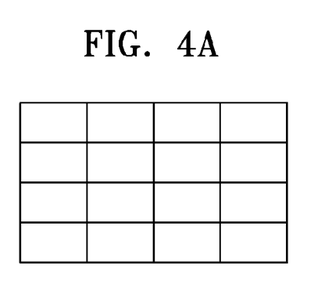
FIGS. 4A to 4D illustrate methods of combining multi-channel images to a single image, according to exemplary embodiments.
Figure 4B:
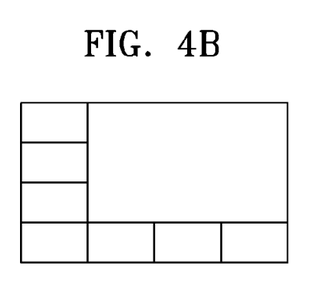

FIG. 4A) illustrates a result of receiving 16 images with a same size and combining the 16 images to a single image. FIG. 4B illustrates a result of receiving eight images with different sizes and combining the eight images to a single image. In FIG. 4B, the upper-right image is three times larger than the other images, and the image combining unit 200 may generate a single image by combining the eight images with different sizes. Similarly, referring to FIG. 4C, the image combining unit 200 generates a single image by combining 13 images, where the center image is larger than images of the other channels. Furthermore, referring to FIG. 4D, the image combining unit 200 generates a single image by combining images of eight channels.

As in the embodiments shown in FIGS. 4A-4D, the image combining unit 200 may generate a single image by combining a plurality of images by using various methods based on settings of a method of outputting multi-channel images set by a user and may combine images with different sizes.

Next, the image processing unit 300 processes and analyzes a single combined image or images of respective channels based on the combined image. To this end, the image processing unit 300 may be embodied as a single chip that could perform storage, calculations, and control functions.

In a case where a combined image is input by the image combining unit 200, as shown in FIGS. 4A-4D, the image processing unit 300 may process and analyze the entire combined image. In other words, in a case as shown in FIG. 4B, the images of eight channels are processed and analyzed as a single image.

Alternatively, even if a single combined image is input by the image combining unit 200, the image processing unit 300 may analyze individual images of respective channels. In other words, in a case as shown in FIG. 4A, the image processing unit 300 may individually analyze the 16 images of respective channels.

Figure 4C:
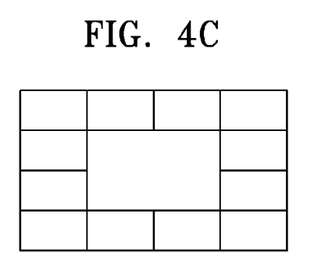
Figure 4D:
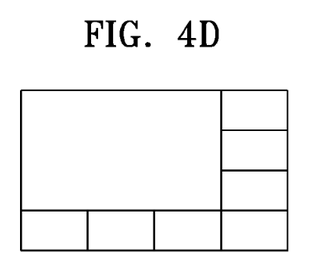

In other words, in a case as shown in FIG. 4B, the image processing unit 300 processes the largest image, that is, the upper-right image, and seven other images, respectively. In the same regard, the image processing unit 300 processes 13 images in a case as shown in FIG. 4C and processes eight images in a case as shown in FIG. 4D.

Accordingly, since the image processing unit 300 may process and analyze a single combined image, the image processing unit 300 may be embodied with a single microprocessor, unlike in the surveillance camera system illustrated in FIG. 1B. Detailed descriptions of operations of the image processing unit 300 will be given below.

Referring to FIG. 3, the image processing unit 300 includes an image pre-processing unit 310, an analysis method selecting unit 320, and an image analyzing unit 330.

The image pre-processing unit 310 of the image processing unit 300 performs necessary image pre-processing prior to analyzing the multi-channel images. The image pre-processing may include resizing images, converting color space of images, converting color dimension of images, etc. As described above, the image pre-processing unit 310 performs image pre-processing on the single combined image, and thus, an overall processing speed may be improved as compared to processing each of the multi-channel images.

Next, the analysis method selecting unit 320 selects whether to use the single combined image or the multi-channel images, that is, images of respective channels for an image analysis. As described above, if an image analysis is performed on a single image generated by combining the multi-channel images by the image combining unit 200, resources of the image processing unit 300 may be efficiently utilized. However, some image analyzing methods applicable to images with a size equal to or above a predetermined size may not be applied to a single combined image. Therefore, the analysis method selecting unit 320 selects whether the image analyzing unit 330 analyzes a single combined image or images of respective channels, based on an image analyzing method to be employed.

In other words, an image analyzing method may be selectively applied based on details of information required for analyzing images. It may be also decided how much data required for an image analysis may be extracted based on the size of input images. Therefore, image analyzing methods may differ according to the sizes of individual channel images extracted from a single combined image. Therefore, there are a few restrictions for an analysis of a single combined image with megapixel sizes, whereas applicable functions may be limited for a combination of smaller images.

In a case as shown in FIG. 4A, if it is assumed that the size of each of the 16 input images is 720×480 pixels and the largest size of an image that may be processed by hardware including the image processing unit 300 is also 720×480 pixels, the image combining unit 200 needs to generate a combined image having a size of 720×480 pixels. Therefore, in a single combined image, the size of each of the images of respective channels should become 180×120 pixels. Since some image analyzing methods may not be applied to images having a size of 180×120 pixels, the analysis method selecting unit 320 may select to perform an image analysis on individual images of respective channels, not the single combined image.

Therefore, the analysis method selecting unit 320 determines whether a detailed image analysis is necessary and provides related information to the image combining unit 200 so that the image combining unit 200 adjusts the number of multi-channel images to be combined into a single image.

For example, in the case of determination of overall change of an image, e.g., determination of a camera tamper, an image analysis may be performed with small input images, and thus, the analysis method selecting unit 320 selects to perform an image analysis on an entire single image generated by combining images of one or more channels. However, since image analyzing methods which need detailed information, such as face detection or plate number detection, may be applied to channels corresponding to input images with sizes equal to or above a predetermined size, the analysis method selecting unit 320 selects different image analyzing methods with respect to respective channels.

The image analyzing unit 330 performs an image analysis on images of respective channels or a single combined image based on a pre-processed single combined image. The image analyzing unit 330 may apply image analyzing methods, such as detecting a background region, detecting and tracking a foreground region and objects, detecting particular events, counting objects, detecting camera tampering, detecting faces, etc., without limitation. The image analyzing unit 330 may apply different image analyzing methods for respective channels.

As described above, when the image analyzing unit 330 applies image analyzing methods, images of respective channels may be individually analyzed according to the applied image analyzing methods. In other words, the image analyzing unit 330 may perform an image analysis on a combined single image for image analyzing methods that are applicable to small input images, such as detecting camera tampering, and may perform an image analysis on individual images of respective channels for image analyzing methods that are applicable to relatively large input images, such as detecting faces.

Finally, the image output unit 400 outputs results of the image analysis for respective channels in a single combined image. The image output unit 400 may not only output an image, but also provide an alarm in a case where a meaningful event is detected by the image analyzing unit 330.

Furthermore, the image output unit 400 includes a video encoder 410 and a transmitting unit 420. The video encoder 410 re-encodes results of analyzing images to output the images, whereas the transmitting unit 420 generates and transmits output signals so that a user may view the encoded images via an external device.

Figure 5A:
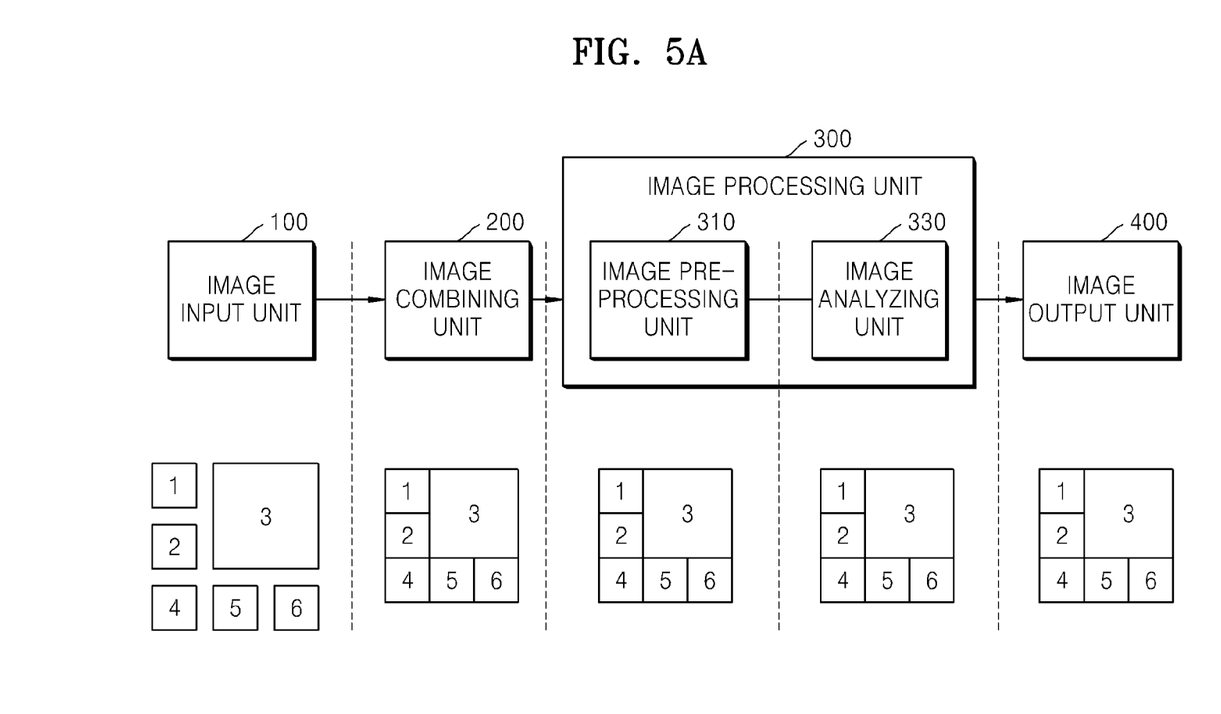
FIGS. 5A and 5B are diagrams showing states of a combination and an analysis of multi-channel images in view of respective components of the multi-channel image analyzing system of FIG. 3, according to an exemplary embodiment.
Figure 5B:
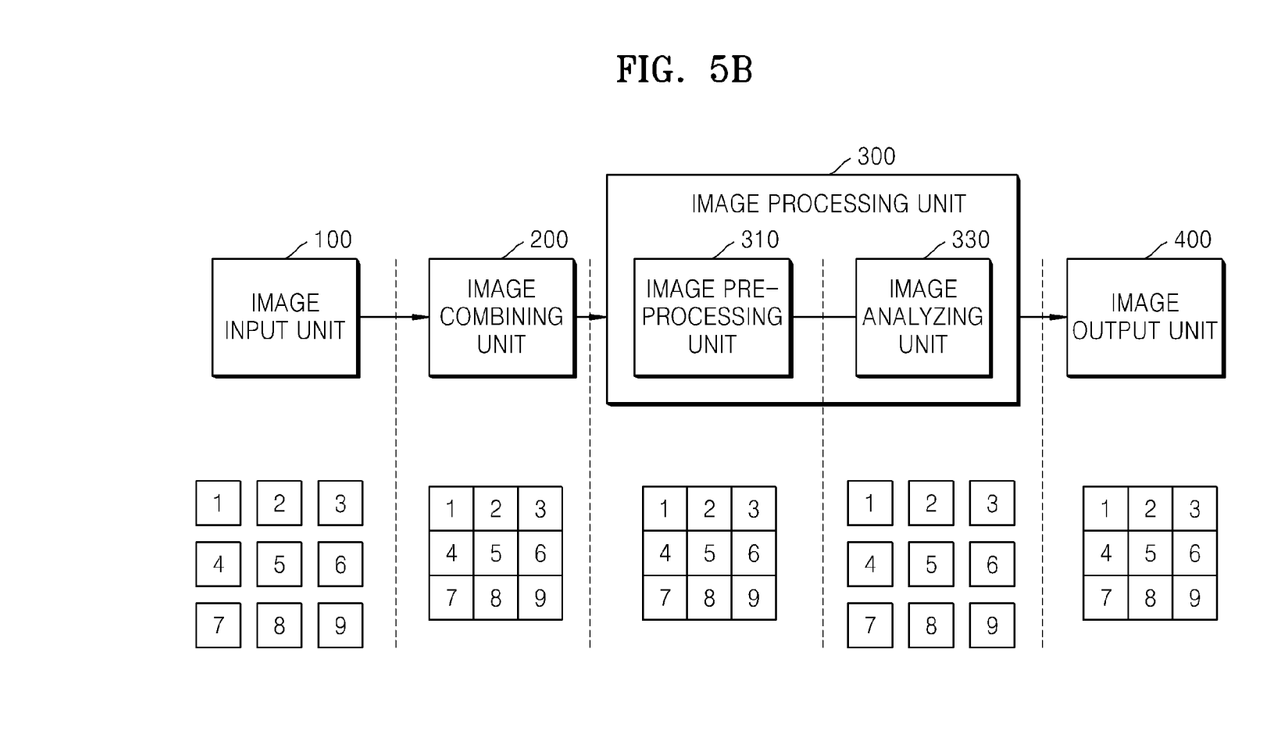

FIGS. 5A and 5B are diagrams showing states of a combination and an analysis of multi-channel images in view of respective components of the multi-channel image analyzing system of FIG. 3, according to an exemplary embodiment.

FIGS. 5A and 5B show two cases, respectively, in which six multi-channel images and nine multi-channel images are input to the multi-channel image analyzing system of FIG. 3, according to an exemplary embodiment. First, referring to FIG. 5, six individual images are input to the image input unit 100. The images may be respectively obtained by six cameras, where an image obtained by one camera may occupy one channel. The image input unit 100 receives and decodes the respective images.

Next, the image combining unit 200 combines images of one or more channels from among the images received by the image input unit 100. Referring to FIG. 5A, six images with different sizes are combined to a single image according to a rule preset by a user. As the number of images to be combined increases, the number of microprocessors or resources used by a microprocessor for analyzing images decreases, and thus, an image analysis may be performed efficiently.

Next, images combined by the image combining unit 200 are transmitted to the image processing unit 300 for an image analysis. First, the image pre-processing unit 310 performs pre-processing for analyzing the images combined by the image combining unit 200. At this time, the image pre-processing unit 310 may consider the multi-channel images as a single image and may perform the pre-processing the multi-channel images as a single image. In other words, the image pre-processing unit 310 considers a combination of the six images as a single image and performs pre-processing for the single image. In a case where the image pre-processing unit 310 performs pre-processing based on the images combined by the image combining unit 200, less resources of the image processing unit 300 may be occupied as compared to a case of performing pre-processing on first through sixth images individually.

Next, the image analyzing unit 330 performs an image analysis based on the pre-processed combined image. Referring to FIG. 5A, the image analyzing unit 330 considers the image generated by combining the first through sixth images as a single image and analyzes the combined image. In this case, the image analyzing unit 330 may apply an image analyzing method that may be applied to even small images.

For example, in case of performing an image analysis for detecting a motion in an image, the image analyzing unit 330 performs motion detection on the entire single combined image and obtains location information regarding a region in which a motion is detected. Next, based on a result of combining images by the image combining unit 200, the image analyzing unit 330 determines a channel corresponding to the region in which the motion is detected.

Next, the image output unit 400 encodes the combined image again and transmits the encoded image to an external device via a transmitting unit. The encoding and transmission may be performed with respect to the combined image instead of each of the six images.

FIG. 5B shows that, based on a selection by the analyzing method selecting unit 320, nine channel images are combined into a single image and pre-processing of the images are performed with respect to the single combined image, while the image analysis is performed on individual images.

Referring to FIG. 5B, as shown in FIG. 5A, the image input unit 100 receives first through ninth images from the respective cameras via respective channels. Next, the image combining unit 200 may generate a single image by combining the nine images based on settings.

Next, the image pre-processing unit 310 performs pre-processing on the combined single image, and thus, the efficiency of utilizing resources of the image processing unit 300 may be improved as compared to a case of performing pre-processing on individual images.

Referring to FIG. 5B, based on a selection by the analyzing method selecting unit 320, the image analyzing unit 330 may separate the single combined image back into individual images and perform an image analysis on the individual images. As shown in FIG. 5B, while the image analyzing unit 330 considers the combined image as a single image and performs an image analysis thereto in FIG. 5A, the image analyzing unit 330 separates the combined image into first through ninth images and performs an image analysis respectively on the individual images. The reason for selecting this method compared to that of FIG. 5A is that different image analyzing methods may be applied based on sizes of images.

In other words, the image analyzing unit 330 may perform an image analysis on a combined image as shown in FIG. 5A in case of detecting the overall change in the combined image and using an image analyzing method that may be applied to even small images. On the contrary, the image analyzing unit 330 may separate a combined image into individual images and perform an image analysis respectively on the individual images as shown in FIG. 5B in a case of using an image analyzing method that may be applied to images with a size equal to or above a predetermined size.

As described above, the image analyzing unit 330 may analyze a combined image by applying various image analyzing methods. Detailed description of a case where the image analyzing unit 330 uses an image analyzing method of detecting an event by separating a foreground and a background will be given below.

Figure 6:
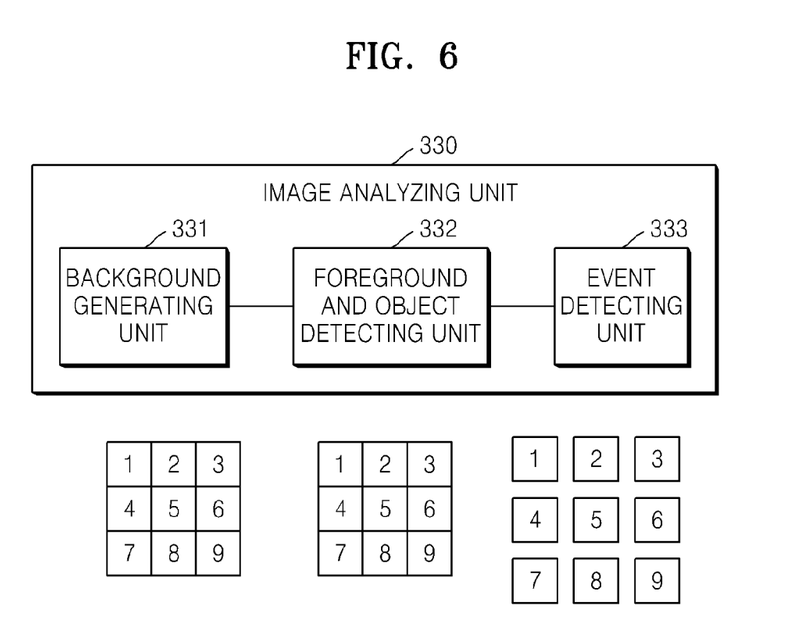
FIG. 6 is a diagram showing an internal configuration of the image analyzing unit which detects an event in an image, according to an exemplary embodiment.

FIG. 6 is a diagram showing an internal configuration of the image analyzing unit 330 which detects an event in an image, according to an exemplary embodiment.

Referring to FIG. 6, the image analyzing unit 330 includes a background generating unit 331, a foreground and object detecting unit 332, and an event detecting unit 333.

The background generating unit 331 generates values corresponding to a region determined as a background which is a region without a motion in a combined image generated by the image combining unit 200 and pre-processed by the image pre-processing unit 310. The background generating unit 331 may detect a background region by using known methods, such as differences between image frames, a local binary pattern (LBP) histogram, a Gaussian mixture model, etc.

The foreground and object detecting unit 332 detects a moving region in the combined image based on a background image generated by the background generating unit 331 and obtains a region determined as a region of an actually moving object. A system for automatically detecting a moving object may be useful in a case where it is expensive for a person to monitor all images in a surveillance system.

Even if the analyzing method selecting unit 320 selects to perform an image analysis on individual channels, the background generating unit 331 and the foreground and object detecting unit 332 may perform corresponding operations on a single combined image. This is because no detailed information is necessary for detecting a background and objects. In other words, the image analyzing unit 330 may perform an image analysis on an entire combined image or individual images, as an occasion demands.

Next, the event detecting unit 333 tracks motions of moving object regions according to changes of images in each individual channel. The multi-channel image analyzing system according to the present embodiment may automatically inform a user if the event detecting unit 333 detects any meaningful motion.

Furthermore, the event detecting unit 333 may analyze tracked motion values and may detect and inform of an unauthorized motion or a particular event. In detail, the event detecting unit 333 may set a threshold value of motions considered as an event. Based on the threshold value, the event detecting unit 333 may not inform of subtle motions, such as trembling of branches due to the wind, and may inform of a motion equal to or exceeding the threshold value, such as a person passing.

Figure 7:
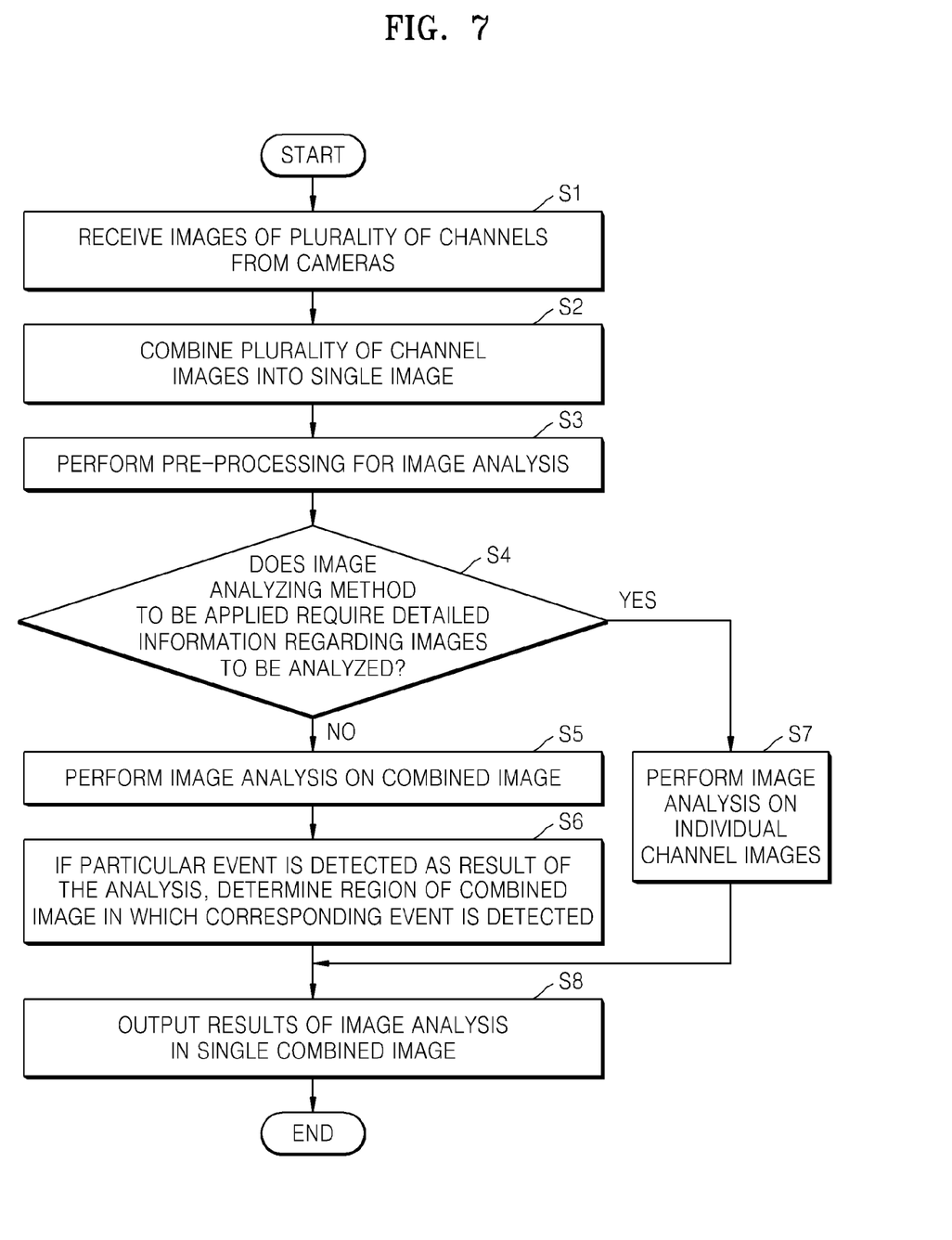
FIG. 7 is a flowchart of operations of an image analysis by the multi-channel image analyzing system of FIG. 3, according to an exemplary embodiment.

FIG. 7 is a flowchart of operations of an image analysis by the multi-channel image analyzing system of FIG. 3, according to an exemplary embodiment.

Referring to FIG. 7, the image input unit 100 receives a plurality of images captured by the plurality of cameras through a plurality of channels, respectively (S1).

Next, the image combining unit 200 combines selected channel images from among the plurality of channel images into a single image according to user settings and transmits the single combined image to the image processing unit 300 (S2).

Next, the image pre-processing unit 310 of the image processing unit 300 performs pre-processing prior to an image analysis (S3).

Next, the analyzing method selecting unit 320 determines whether an image analyzing method to be applied requires detailed information regarding images to be analyzed (S4).

If it is determined at operation S4 that detailed information regarding images is not required, the image analyzing unit 330 performs image analysis on the combined image (S5).

After the combined image is analyzed, if a particular event is detected as a result of the analysis, the image analyzing unit 330 determines a region of the combined image in which the particular event is detected (S6).

If it is determined at operation S4 that detailed information regarding images is not required, the image analyzing unit 330 performs image analysis on individual images (S7).

Finally, the image output unit 400 outputs a result of the image analysis in a single combined image (S8).

Figure 8:
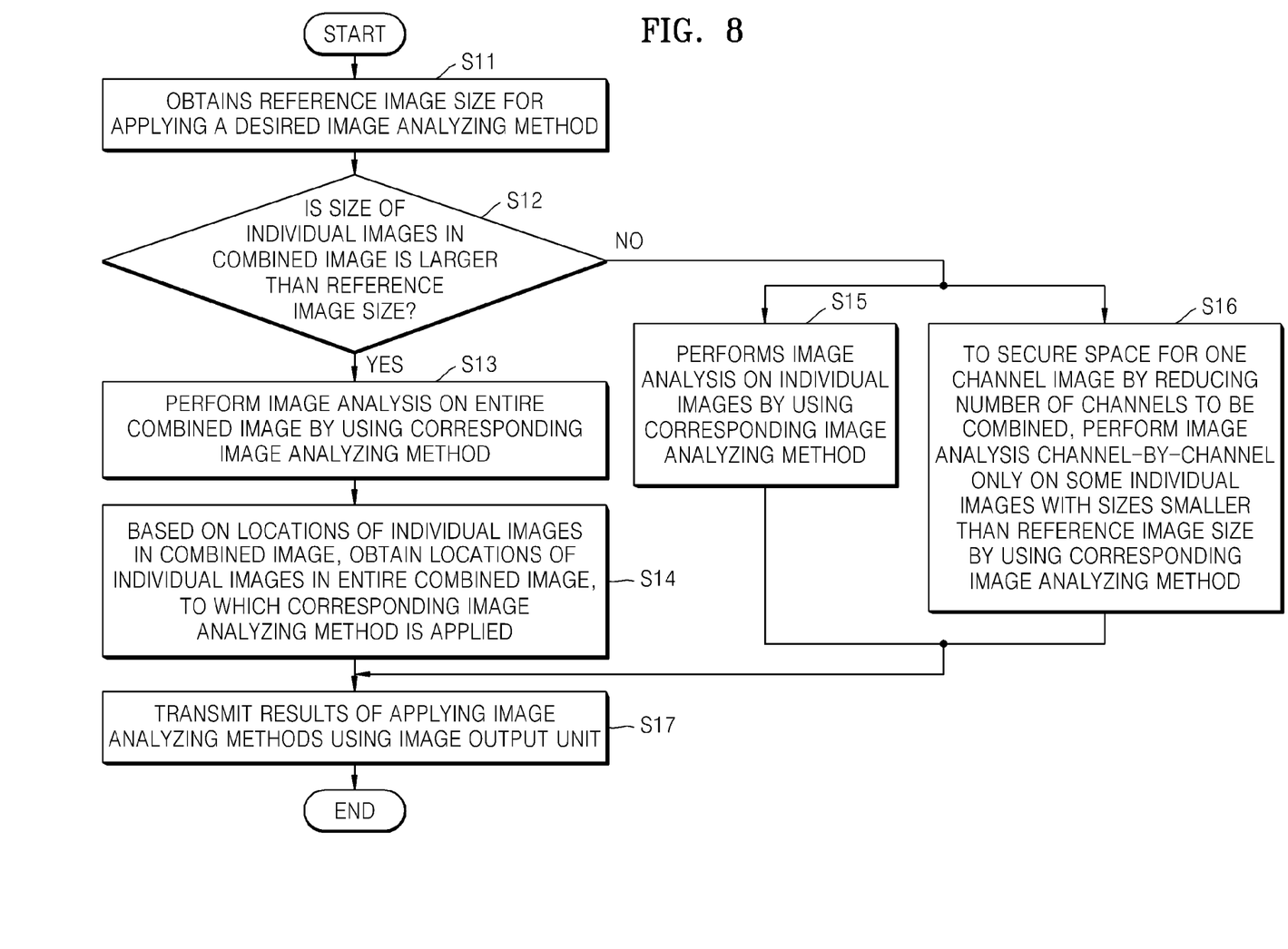
FIG. 8 is a flowchart of operations of an image analysis by the multi-channel image analyzing system of FIG. 3, according to an exemplary embodiment.

FIG. 8 is a flowchart of operations of an image analysis by the multi-channel image analyzing system of FIG. 3, according to another exemplary embodiment.

First, the analysis method selecting unit 320 obtains information about a reference image size for applying a desired image analyzing method to a single combined image generated by combining selected channel images among a plurality of channel images (operation S11).

Next, 'it is determined whether a size of each of the individual channel images in the single combined image is larger than the reference image size (operation S12).

If the sizes of all of the individual channel images in the combined image are larger than the reference image size, an image analyzing unit performs an image analysis with respect to the entire combined image by treating the selected channel images as a single image using a corresponding image analyzing method (operation S13).

Next, based on locations of individual channel images in the single combined image, a channel, among the selected channels, to which a result of the corresponding image analyzing method applies is determined (operation S14).

On the other hand, if it is determined that at least one of the individual channel images is not larger than the reference image size, the image analyzing unit performs an image analysis with respect to each of the individual channel images by using the corresponding image analyzing method (operation S15).

Alternatively, to secure a space for one channel image by reducing a number of channels to be combined, the image analyzing unit 330 performs an image analysis channel-by-channel only on some individual channel images with sizes smaller than the reference image size by using the corresponding image analyzing method (operation S16).

Finally, the image analyzing unit 330 transmits a result of applying the corresponding image analyzing method using an image output unit (operation S17).

As described above, according to the one or more of the exemplary embodiments, a multi-channel surveillance system may process and analyze images based on a combined image, and thus, the performance of the surveillance system may be improved.

It should be understood that the above exemplary embodiments described should be considered in a descriptive sense only and not for purposes of limitation. Descriptions of features or aspects within each embodiment should typically be considered as available for other similar features or aspects in other embodiments.

What is claimed is:

1. A method of analyzing multi-channel images, the method comprising:
   receiving a plurality of images through a plurality of channels, respectively;
   combining selected images among the plurality of images into a single image, wherein at least one selected image having a first size is resized to a second size in the combined image;
   obtaining information regarding each of the selected images in the combined image;
   determining, based on the obtained information, an image analysis with respect to:
      entirety of the combined image by treating the selected images as a single image; or
      each of the selected images by separating the combined image into the selected images, the separated selected images comprising the at least one selected image having the first size; and
   performing an image analysis according to a result of the determination.

2. The method of claim 1, wherein, in case of performing the image analysis with respect to each of the separated selected images, different image analyzing methods are applied to at least two of the separated selected images, respectively.

3. The method of claim 1, wherein, if all of the selected images in the combined image are larger than a reference size, the image analysis is performed with respect to entirety of the combined image by treating the selected images as a single image, and
   wherein, if at least one of the selected images in the combined image is not larger than the reference size, the image analysis is performed with respect to each of the separated selected images.

4. The method of claim 1, wherein the information regarding each of the selected images comprises a number of pixels constituting each of the selected images.

5. The method of claim 1, wherein, if all of the selected images in the combined image are constituted by pixels larger than a reference number of pixels, the image analysis is performed with respect to entirety of the combined image by treating the selected images as a single image, and
   wherein, if at least one of the selected images in the combined image is constituted by pixels not larger than the reference number of pixels, the image analysis is performed with respect to each of the separated selected images.

6. The method of claim 1, further comprising pre-processing the combined image before the performing the image analysis,
   wherein the pre-processing comprises at least one of image size conversion, color space conversion and color dimension conversion.

7. The method of claim 1, further comprising detecting a foreground region in the combined image by processing the entirety of the combined image by treating the selected images as a single image,
   wherein the performing the image analysis comprises detecting occurrence of camera tempering to at least one of a plurality of cameras, from which the plurality of images are obtained, with respect to each of the plurality of channels.

8. The method of claim 1, further comprising:
   detecting a motion region in the combined image by processing the entirety of the combined image with treating the selected images as a single image;
   obtaining location information about the motion region; and
   determining a channel, among selected channels among the plurality of channels, corresponding to the motion region.

9. The method of claim 1, further comprising:
   combining the separated selected images used for the image analysis into another single image, after performing the image analysis with respect to each of the separated selected images; and
   outputting the other single image with a result of the image analysis.

10. A multi-channel image analyzing system comprising at least one processor, the multi-channel image analyzing system further comprising:
    an image receiving unit, controlled by the at least one processor, and configured to receive a plurality of images through a plurality of channels, respectively;
    an image combining unit, controlled by the at least one processor, and configured to combine selected images among the plurality of images into a single image, wherein at least one selected image having a first size is resized to a second size in the combined image;
    an image analyzing method selecting unit, controlled by the at least one processor, and configured to obtain information regarding each of the selected images in the combined image and determine, based on the obtained information, whether to perform an image analysis with respect to:
      entirety of the combined image by treating the selected images as a single image; or
      each of the selected images by separating the combined image into the selected images, the separated selected images comprising the at least one selected image having the first size; and
    an image analyzing unit, controlled by the at least one processor, and configured to perform an image analysis according to a result of the determination.

11. The multi-channel image analyzing system of claim 10, wherein the image analyzing unit performs the image analysis with respect to each of the separated selected images by applying different image analyzing methods to at least two of the separated selected images, respectively.

12. The multi-channel image analyzing system of claim 10, wherein, if the image analyzing method selecting unit determines that all of the selected images in the combined image are larger than a reference size, the image analyzing unit performs the image analysis with respect to entirety of the combined image by treating the selected images as a single image, and
    wherein, if the image analyzing method selecting unit determines that at least one of the selected images in the combined image is not larger than the reference size, the image analyzing unit performs the image analysis with respect to each of the separated selected images.

13. The multi-channel image analyzing system of claim 10, wherein the information regarding each of the selected images comprises a number of pixels constituting each of the selected images.

14. The multi-channel image analyzing system of claim 10, wherein, if the image analyzing method selecting unit determines that all of the selected images in the combined image are constituted by pixels larger than a reference number of pixels, the image analyzing unit performs the image analysis with respect to entirety of the combined image by treating the selected images as a single image, and
    wherein, if the image analyzing method selecting unit determines that at least one of the selected images in the combined image is constituted by pixels not larger than the reference number of pixels, the image analyzing unit performs the image analysis with respect to each of the separated selected images.

15. The multi-channel image analyzing system of claim 10, further comprising an image pre-processing unit, controlled by the at least one processor, and configured to perform pre-processing the combined image before the image analyzing unit performs the image analysis,
    wherein the pre-processing comprises at least one of image size conversion, color space conversion and color dimension conversion.

16. The multi-channel image analyzing system of claim 10, wherein the image analyzing unit comprises:
    a foreground detection unit, controlled by the at least one processor, and configured to detect a foreground region in the combined image by processing the entirety of the combined image by treating the selected images as a single image; and
    an event detecting unit, controlled by the at least one processor, and configured to detect occurrence of camera tempering to at least one of a plurality of cameras, from which the plurality of images are obtained, with respect to each of the plurality of channels.

17. The multi-channel image analyzing system of claim 10, wherein the image analyzing unit comprises:
    a foreground detection unit, controlled by the at least one processor, and configured to detect a motion region in the combined image by processing the entirety of the combined image with treating the selected images as a single image; and
    an event detecting unit, controlled by the at least one processor, and configured to obtain location information about the motion region, and determine a channel, among selected channels in the plurality of channels, corresponding to the motion region.

18. The multi-channel image analyzing system of claim 10, further comprising an image output unit, controlled by the at least one processor, and configured to:
    combine the selected images used for the image analysis into another single image, after the image analyzing unit performs the image analysis with respect to each of the separated selected images; and
    output the other single image with a result of the image analysis.

* * * * *